United States Patent
Morishita

(10) Patent No.: US 9,514,554 B2
(45) Date of Patent: Dec. 6, 2016

(54) COMPUTER READABLE RECORDING MEDIUM RECORDED WITH GRAPHICS EDITING PROGRAM, AND GRAPHICS EDITING APPARATUS

(75) Inventor: Ryohei Morishita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 807 days.

(21) Appl. No.: 11/454,535

(22) Filed: Jun. 16, 2006

(65) Prior Publication Data

US 2007/0206010 A1  Sep. 6, 2007

(30) Foreign Application Priority Data

Mar. 2, 2006 (JP) ................................. 2006-056113

(51) Int. Cl.
*G09G 5/00* (2006.01)
*G06T 11/60* (2006.01)

(52) U.S. Cl.
CPC ..................................... *G06T 11/60* (2013.01)

(58) Field of Classification Search
USPC ........................................ 345/473, 619, 474
See application file for complete search history.

(56) References Cited

U.S. PATENT DOCUMENTS

| | | | | |
|---|---|---|---|---|
| 4,872,167 A * | 10/1989 | Maezawa et al. | .......... | 714/38.13 |
| 5,212,653 A * | 5/1993 | Tanaka | ........................... | 716/120 |
| 5,517,604 A * | 5/1996 | Yuura et al. | .................. | 345/441 |
| 6,023,703 A * | 2/2000 | Hill | | |
| 6,058,397 A * | 5/2000 | Barrus et al. | .............. | 707/104.1 |
| 6,392,651 B1 * | 5/2002 | Stradley | ........................ | 345/473 |
| 6,686,918 B1 * | 2/2004 | Cajolet et al. | ................ | 345/473 |
| 7,330,184 B2 * | 2/2008 | Leung | ........................... | 345/441 |
| 7,561,160 B2 * | 7/2009 | Fukuya | ......................... | 345/474 |
| 2001/0035872 A1 * | 11/2001 | Erskine | ......................... | 345/630 |
| 2002/0154117 A1 * | 10/2002 | Saitou | ........................... | 345/440 |
| 2005/0081146 A1 * | 4/2005 | Tanaka et al. | ................ | 715/517 |
| 2007/0171224 A1 * | 7/2007 | MacPherson | ................. | 345/440 |
| 2007/0208549 A1 * | 9/2007 | Blevins et al. | ................... | 703/6 |

FOREIGN PATENT DOCUMENTS

| | | |
|---|---|---|
| JP | 07-325690 | 12/1995 |
| JP | 2005-182193 | 7/2005 |

OTHER PUBLICATIONS

"Japanese Office Action" mailed by JPO and corresponding to Japanese application No. 2006-056113 on Mar. 29, 2011, with English translation.
Walker, Mark H., et al., "Microsoft Office Visio2003" Official Manual, First Ver., Japan, Nikkei BP Softpress, Minoru Matsuzaki, First Ed. Apr. 4, 2005, pp. 253-267 & pp. 565-587, partial English translation.

* cited by examiner

*Primary Examiner* — M Good Johnson
(74) *Attorney, Agent, or Firm* — Fujitsu Patent Center

(57) ABSTRACT

When a new element is interactively arranged in cooperative with an input device and a display device, an element arranged just before is specified based on the time relation of the new element to already arranged elements, the association is made to provide a relation between the specified element and the newly arranged element, and the relation between them is displayed on the display device. Therefore, an actual condition in that a series of relational elements is arranged successively in time is utilized, to thereby associate the elements according to the time relation thereof to provide a relation therebetween. Hence, the relation between the elements is easily provided while reflecting the intention of user as much as possible.

13 Claims, 7 Drawing Sheets

FIG.2

| ELEMENT | RELATION |
|---|---|
| ELEMENT 1 | RELATION 1 |
| ELEMENT 2 | RELATION 1 |

FIG.3

| RELATION | CONNECTION STATE |
|---|---|
| RELATION 1 | ELEMENT 1 – ELEMENT 2 |

FIG.4

| ELEMENT | ARRANGEMENT TIME |
|---|---|
| ELEMENT 1 | 2006/02/20 10:20:30 |
| ELEMENT 2 | 2006/02/20 10:22:46 |

FIG.7

| ELEMENT | RELATION |
|---|---|
| ELEMENT 1 | RELATION 1 |
| ELEMENT 2 | RELATION 1, RELATION 2 |
| ELEMENT 3 | RELATION 2 |

FIG.8

| RELATION | CONNECTION STATE |
|---|---|
| RELATION 1 | ELEMENT 1 – ELEMENT 2 |
| RELATION 2 | ELEMENT 2 – ELEMENT 3 |

FIG.9

| ELEMENT | ARRANGEMENT TIME |
|---|---|
| ELEMENT 1 | 2006/02/20 10:20:30 |
| ELEMENT 2 | 2006/02/20 10:22:46 |
| ELEMENT 3 | 2006/02/20 10:25:09 |

FIG.10

| ELEMENT | ARRANGEMENT SEQUENCE |
|---|---|
| ELEMENT 1 | 1 |
| ELEMENT 2 | 2 |

FIG.11

| ELEMENT | VARIABLE |
|---|---|
| ELEMENT 1 | false |
| ELEMENT 2 | true |

FIG.12

| LATEST ELEMENT |
|---|
| ELEMENT 2 |

COMPUTER READABLE RECORDING MEDIUM RECORDED WITH GRAPHICS EDITING PROGRAM, AND GRAPHICS EDITING APPARATUS

BACKGROUND OF THE INVENTION

1. Field of the Invention

The present invention generally relates to a technology for easily providing the relation between elements while reflecting the intent of user as much as possible, in a graphics editing technology for performing the system development or the like in a visual environment using graphics. More particularly, the present invention relates to a computer readable recording medium with graphics editing program and a graphics editing apparatus.

2. Description of the Related Art

In recent years, a UML (Unified Modeling Language) tool as a graphics editor has been widely used, for performing efficiently the system development or the like in a visual environment. The UML tool provides functions of preparing and editing, as a fundamental design diagram of a system, a use-case diagram, an activity diagram, a state machine diagram, a sequence diagram, a class diagram and the like, in each of which various elements are connected to each other depending on the relation thereof. In an operation of the UML tool, since the relation between elements need to be provided by associating the elements, after the elements are arranged, it is necessary to designate two elements using an input device such as a mouse or the like, to provide the relation between the two elements. Therefore, in order to easily provide the relation between elements, as disclosed in Japanese Unexamined Patent Publication No. 7-325690, there has been proposed a technology for identifying an element which is present within a predetermined distance from a new arranged element, to automatically provide the relation between these elements by association.

However, in the conventionally proposed technology, the relation between the elements is provided by associating the elements with one another, based on the distance relation between these elements. Therefore, when the association is made between elements which are apart in distance from each other, there is a possibility that the intention of user is not necessarily reflected. As a specific example thereof, in the process of preparing a flowchart, if an element indicating one of processings branched in the determination processing is arranged in the vicinity of an element indicating the other processing, the association is made between these elements.

The present invention has been accomplished with a view to solving the above problem in the conventional technology and has an object to provide a graphics editing technology capable of easily providing the relation between elements while reflecting the intent of user as much as possible, by utilizing an actual condition in that a series of relational elements is arranged successively in time to provide the relation between the elements according to the time relation thereof.

SUMMARY OF THE INVENTION

In order to achieve the above object, in a graphics editing technology according to the present invention, when a new element is arranged interactively in cooperative with an input device and a display device, an element arranged just before is specified based on the time relation of the new element to already arranged elements. Then, the association is made between the specified element and the newly arranged element, to thereby display the relation between these elements on the display device. Therefore, it is possible to easily provide the relation between the elements by association while reflecting the intent of user as much as possible, by utilizing an actual condition in that a series of relational elements is arranged successively in time to provide the relation between the elements by association, according to the time relation thereof.

At this time, as the time relation of the newly arranged element to the already arranged elements, it is possible to use arrangement times of the elements sequentially stored in a storage device, the arrangement sequence of the elements or a variable indicating whether or not the pertinent element is the most newly arranged one, or specific information of the elements, which is sequentially overwritten to be stored in the storage device in response to the element arrangement.

The other objects, features and advantages of the present invention will be more apparent from the following description of the embodiment with reference to the accompanying drawings.

BRIEF DESCRIPTION OF THE DRAWINGS

FIG. 2 is an explanatory diagram of an element relation table;

FIG. 3 is an explanatory diagram of a relation connection table;

FIG. 4 is an explanatory diagram of an arrangement time table;

FIG. 7 is an explanatory diagram of the element relation table which is updated with the new element arrangement;

FIG. 8 is an explanatory diagram of the relation connection table which is updated with the new element arrangement;

FIG. 9 is an explanatory diagram of the arrangement time table which is updated with the new element arrangement;

FIG. 10 is an explanatory diagram of an arrangement sequence table applicable as the time relation between elements;

FIG. 11 is an explanatory diagram of a newest element variable table applicable as the time relation between elements; and FIG. 12 is an explanatory diagram of a newest element table applicable as the time relation between elements.

DESCRIPTION OF THE PREFERRED EMBODIMENT

Hereinafter, the present invention will be described with reference to drawings.

Figure 1:
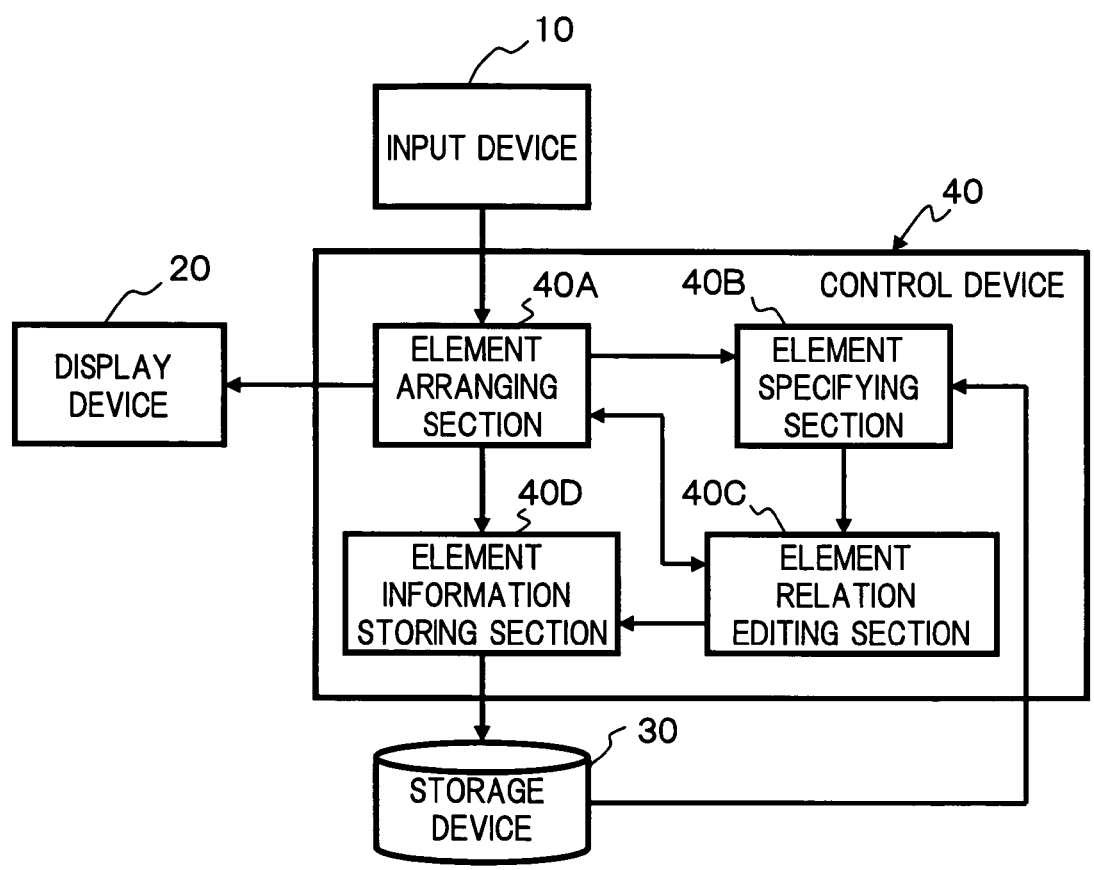
FIG. 1 is an entire block diagram of a graphical editing apparatus which realizes the present invention.

FIG. 1 shows an entire configuration of a graphics editing apparatus which realizes a graphics editing technology according to the present invention.

The graphics editing apparatus is constructed by installing a graphics editing program recorded in a computer readable recording medium, such as a CD-ROM, a DVD-ROM or the like, in an all-purpose computer such as a PC (Personal Computer). More specifically, the graphics editing apparatus includes: an input device 10 provided with a pointing device, such as a mouse, and a keyboard; a display device 20 comprised of a CRT (Cathode Ray Tube) or a LCD (Liquid Crystal Display) or the like; a storage device 30 comprised of a hard disk or the like; and a control device 40 provided with a memory and a CPU (Central Processing Unit).

In the storage device 30, as information of elements constituting a fundamental design diagram of a system or the like, in addition to the properties describing types of the elements and arrangement positions thereof or the like, there are registered an element relation table as shown in FIG. 2, a relation connection table as shown in FIG. 3 and an arrangement time table as shown in FIG. 4 respectively. The element relation table describes the relation of each element in association with the respective elements. Further, the relation connection table describes connection states between the elements in association with each relation. The arrangement time table describes arrangement times of the elements in association with the respective elements.

On the other hand, in the control device 40, the graphics editing program is executed, so that an element arranging section 40A, an element specifying section 40B, an element relation editing section 40C and an element information storing section 40D are realized, respectively. The element arranging section 40A provides a function of cooperating with the input device 10 and the display device 20, to interactively arrange elements. The element specifying section 40B provides a function of, when a new element is arranged by the element arranging section 40A, specifying the element arranged just before, based on the time relation of the new element to the already arranged elements. The element relation editing section 40C provides a function of making the association between the element arranged just before, and the newly arranged element, according to the specifying result by the element specifying section 40B. The element information storing section 40D provides functions of, when the new element is arranged by the element arranging section 40A, registering sequentially the properties of the newly arranged element, and also of, when the association between the elements is made by the element relation editing section 40C, updating sequentially the element relation table, the relation connection table and the arrangement time table which are registered in the storage device 30. Further, the element arranging section 40A also provides a function of, when the association between the elements is made by the element relation editing section 40C, displaying this relation on the display device 20.

Here, an element arranging step, element arranging means, a relation display step and relation display means are realized respectively by the element arranging section 40A, and also, an element specifying step and element specifying means are realized respectively by the element specifying section 40B. Further, a associating step and associating means are realized respectively by the element relation editing section 40C, and also, an arrangement time storing step is realized by the element information storing section 40D.

Figure 5:
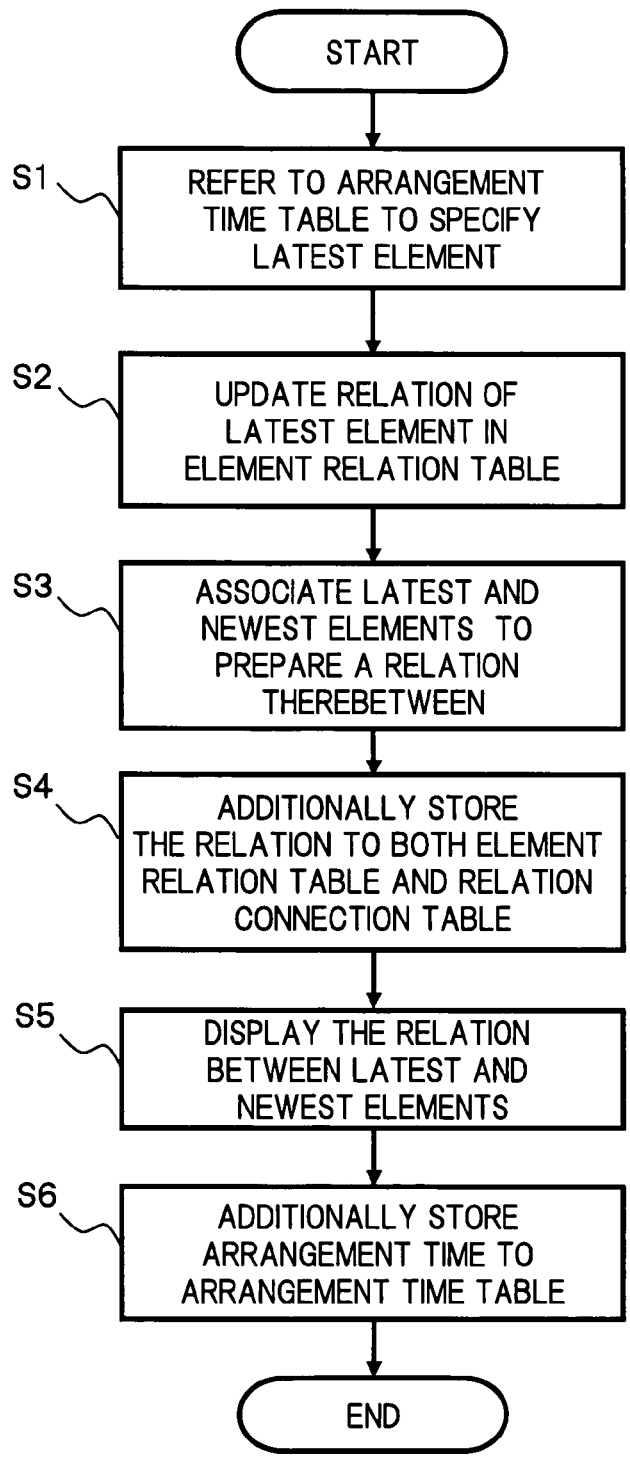
FIG. 5 is a flowchart showing the processing content of a graphical editing program.

FIG. 5 shows the processing content of the graphics editing program which is executed in the control device 40 at a momentum of when a new element is interactively arranged.

In step 1 (to be abbreviated as S1 in the figure, and the same rule will be applied hereunder), the arrangement time table registered in the storage device 30 is referred to, as the time relation of the new element to the already arranged elements, and the element arranged just before (to be referred to as the latest element hereunder) is specified based on the arrangement times of the already arranged elements.

In step 2, the new relation is added to the element relation table registered in the storage device 30 as the relation of the latest element, to thereby update the element relation table.

In step 3, the new association is made between the latest element and the newly arranged element (to be referred to as the newest element), to thereby prepare the relation between them.

In step 4, the association between the latest element and the newest element is additionally stored in the element relation table and the relation connection table which are registered in the storage device 30.

In step 5, the association between the latest element and the newest element is displayed on the display device 20.

In step 6, an arrangement time of the newest element is additionally stored in the arrangement time table registered in the storage device 30.

According to such a graphics editing apparatus as described above, when the newest element is interactively arranged in cooperative with the input device 10 and the display device 20, the latest element is specified based on the time relation of the newest element to the already arranged elements. Then, an association is made between the latest element and the newest element under a fresh relation, and this relation is displayed on the display device 20.

Figure 6:
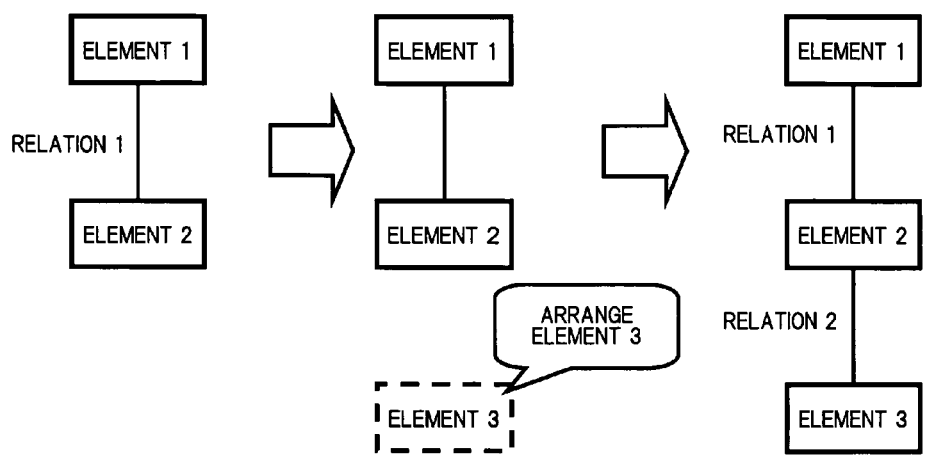
FIG. 6 is an explanatory diagram of a functional overview of the graphical editing apparatus.

Here, in order to easily understand the processing of making the association between the elements by the graphics editing apparatus, as shown in FIG. 6, the description is made in time-series on the processing for when an element 3 is newly arranged on a graphic on which is set the relation 1 associating an element 1 and an element 2 to each other.

When the element 3 is newly arranged, the arrangement time table shown in FIG. 4 is referred to, and the latest element is specified to be the element 2, based on the arrangement times in the arrangement time table. When the latest element can be specified, the new relation 2 is added as the relation of the element 2 in the element relation table shown in FIG. 7. Further, the relation between the element 2 being the latest element and the element 3 being the newest element is provided as the relation 2, and as shown in FIG. 7, the relation 2 of the element 3 is added to the element relation table and also, as shown in FIG. 8, a connection state of the relation 2 (the connection between the element 2 and the element 3) is added to the relation connection table. Thereafter, the relation 2 between the element 2 and the element 3 is displayed on the display device 20, and as shown in FIG. 9, an arrangement time of the element 3 is added to the arrangement time table.

Consequently, the association between the elements is made according to the time relation, by utilizing an actual condition in that a series of relational elements is arranged successively in time, thereby capable of easily providing the relation between the elements while reflecting the intention of user as much as possible.

In order to specify the latest element based on the time relation of the newest element to the already arranged elements, it is also possible to use, in place of the arrangement time table, an arrangement sequence table describing the element arrangement sequence in association with the respective elements as shown in FIG. 10; a latest element variable table describing a variable indicating whether or not the pertinent element is the most newly arranged element, in association with the respective elements, as shown in FIG. 11; or a latest element table in which the information specifying the latest element is overwritten sequentially, as shown in FIG. 12. At this time, the element information storing section 40D functions as an arrangement sequence storing step, a variable storing step or a specific information storing step, to update the respective tables registered in the storage device 30. On the other hand, the element specifying section 40B may refer to the respective tables to specify the latest element.

Incidentally, in order to enable the designation as to whether or not the relation is provided between the elements, it is desirable that there is provided a designating function of arbitrarily designating as to whether the element specifying function provided by the element specifying section 40 is made valid or invalid. At this time, in the designation function, when the newest element is arranged while a predetermined key of the keyboard being pressed, or when a menu displayed on the display device 20 is selected, the element specifying function may be switched to be valid or invalid. Here, the designating function realizes a designating step.

In such a manner as described above, it becomes possible to contribute to the arrangement facility of an element such as the firstly arranged element, which does not need to be related to another element, to thereby respond to various demands of users. Further, if the element specifying function is switched to be valid or invalid when the newest element is arranged while the predetermined key of the keyboard being pressed, it is possible to designate flexibly and dynamically as to whether or not the relation of the newest element is made, according to the arrangement status of the elements.

Moreover, the present invention is not limited to a "UML tool", and is applicable to the software for preparing a flowchart or a CAD.

What is claimed is:

1. A computer readable, non-transitory medium storing a graphics editing program, which when executed by a computer causes the computer to perform a method, the method comprising:
    arranging elements interactively with an input device on a display device, the arranging including introducing a new element to an arrangement;
    specifying an element most recently arranged prior to introducing the new element when a user interactively arranges the new element;
    associating the new element only with the element most recently arranged prior to introducing the new element to provide a relation therebetween; and
    displaying on the display device a line indicating the relation between the new element and the element most recently arranged prior to introducing the new element, the line being introduced on the display device to connect the element most recently arranged prior to introducing the new element and the new element by the line in response to introduction of the new element on the display device.

2. The computer readable, non-transitory medium storing a graphics editing program according to claim 1, the method further comprising:
    sequentially storing, in a storage device, arrangement times of the elements arranged by the arranging; and
    the specifying refers to the arrangement times of the elements stored in the storage device, to specify the element most recently arranged to prior to introducing the new element.

3. The computer readable, non-transitory medium storing a graphics editing program according to claim 1, the method further comprising:
    sequentially storing, in a storage device, the arrangement sequence of the elements arranged by the arranging; and
    the specifying refers to the arrangement sequence of the elements stored in the storage device, to specify the element most recently arranged prior to introducing the new element.

4. The computer readable, non-transitory medium storing a graphics editing program according to claim 1, the method further comprising:
    sequentially storing, in a storage device, a variable indicating whether or not an element is the most recently arranged element prior to introducing the new element; and
    the specifying refers to the variable stored in the storage device to specify the element most recently arranged prior to introducing the new element.

5. The computer readable, non-transitory medium storing a graphics editing program according to claim 1, the method further comprising:
    sequentially overwriting, when an element is arranged by the arranging, information specifying the arranged element in a storage device to store the information in the storage device; and
    the specifying refers to the information stored in the storage device, to specify the element most recently arranged prior to introducing the new element.

6. The computer readable, non-transitory medium storing a graphics editing program according to claim 1, the method further comprising:
    designating whether the specifying is valid or invalid.

7. The computer readable, non-transitory medium storing a graphics editing program according to claim 6,
    wherein the input device comprises a keyboard, and
    the designating designates the specifying as valid or invalid when the new element is arranged based on a key of the keyboard being pressed.

8. The computer readable, non-transitory medium storing a graphics editing program according to claim 6,
    wherein the designating designates the specifying as valid or invalid based on a menu displayed on the display device being selected.

9. A graphics editing apparatus comprising:
    an element arranging section to interactively arrange elements and to introduce a new element to an arrangement;
    an element specifying section to specify an element most recently arranged prior to introducing the new element when a user interactively arranges the new element;
    an element relation editing section to associate the new element only with the element specified by the element specifying section to provide a relation therebetween; and
    a display to display a line indicating the relation between the new element and the element most recently arranged prior to the new element, the line being introduced on the display device to connect the element most recently arranged prior to introducing the new element and the new element by the line in response to introduction of the new element on the display device.

10. A computer-readable, non-transitory medium storing a graphic editing program that causes a computer to execute a procedure, the procedure comprising:
    automatically specifying only a second graphic element which is subjected to display processing just prior to introducing a first graphic element, as a connection target of a line element indicating a connecting relation between the first graphic element and the second graphic element; and displaying the line element between the first graphic element and the second graphic element.

11. The computer-readable, non-transitory medium according to claim 10, wherein the line element connects the first graphic element and the second graphic element.

12. A method for displaying graphics using a computer, the method comprising:

automatically specifying only a second graphic element which is subjected to display processing just prior to introducing a first graphic element, as a connection target of a line element indicating a connecting relation between the first graphic element and the second graphic element; and displaying the line element between the first graphic element and the second graphic element on a display.

13. The method according to claim 12, wherein the line element connects the first graphic element and the second graphic element.

* * * * *